United States Patent
Feng et al.

(10) Patent No.: US 10,182,205 B2
(45) Date of Patent: *Jan. 15, 2019

(54) VIDEO CONFERENCING OVER IP NETWORKS

(71) Applicant: Krush Technologies, LLC, Dayton, OH (US)

(72) Inventors: Chang Feng, Dayton, OH (US); Sergey Pesherov, Rishon Lezion (IL)

(73) Assignee: Krush Technologies, LLC, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/882,657

(22) Filed: Jan. 29, 2018

(65) Prior Publication Data

US 2018/0152669 A1 May 31, 2018

Related U.S. Application Data

(63) Continuation of application No. 15/495,734, filed on Apr. 24, 2017, now Pat. No. 9,883,139, which is a (Continued)

(51) Int. Cl.
*H04N 7/14* (2006.01)
*H04N 7/15* (2006.01)
(Continued)

(52) U.S. Cl.
CPC ............ *H04N 7/147* (2013.01); *G06Q 10/10* (2013.01); *H04L 7/0008* (2013.01);
(Continued)

(58) Field of Classification Search
CPC ............ H04L 41/509; H04M 1/72547; H04M 3/5307; H04M 3/5315
See application file for complete search history.

(56) References Cited

U.S. PATENT DOCUMENTS 5,602,992 A    2/1997   Danneels
5,893,126 A * 4/1999   Drews ................... G06F 3/0481
                                                         715/203
(Continued)

FOREIGN PATENT DOCUMENTS

EP          0789492      8/1997
EP          1243090      9/2002
(Continued)

OTHER PUBLICATIONS

International Search Report and Written Opinion of the International Searching Authority dated Jul. 29, 2008 in connection with International Application No. PCT/IL07/000981.

*Primary Examiner* — Arvin Eskandarnia
(74) *Attorney, Agent, or Firm* — Baker & McKenzie LLP

(57) ABSTRACT

A method for communication includes establishing multiple communication links over a packet network between a server and plurality of client computers that are to participate in a video teleconference. The client computers may also create secondary communication links that function similarly to links between the server and client computers. The server receives from the client computers uplink audio packets and uplink video packets, which respectively contain audio and video data captured by each of the client computers. The server mixes the audio data from the uplink audio packets so as to create respective streams of mixed audio data for transmission to the client computers and transmits to the client computers downlink audio packets containing the respective streams of mixed audio data. The server relays the video data to the client computers in downlink video packets. The client computers receive and synchronize the video data with the mixed audio data.

20 Claims, 10 Drawing Sheets

Related U.S. Application Data continuation of application No. 14/935,987, filed on Nov. 9, 2015, now Pat. No. 9,635,315, which is a continuation-in-part of application No. 14/507,405, filed on Oct. 6, 2014, now Pat. No. 9,185,347, which is a continuation of application No. 11/890,382, filed on Aug. 6, 2007, now Pat. No. 8,856,371.

(60) Provisional application No. 60/835,998, filed on Aug. 7, 2006.

(51) Int. Cl.

| | | |
|---|---|---|
| *H04L 12/859* | (2013.01) | |
| *H04L 7/00* | (2006.01) | |
| *H04L 29/06* | (2006.01) | |
| *H04L 12/24* | (2006.01) | |
| *G06Q 10/10* | (2012.01) | |
| *H04M 3/53* | (2006.01) | |
| *H04L 12/811* | (2013.01) | |
| *H04L 12/875* | (2013.01) | |
| *H04M 7/00* | (2006.01) | |
| *H04M 1/253* | (2006.01) | |
| *H04L 12/853* | (2013.01) | |
| *H04M 3/56* | (2006.01) | |

(52) U.S. Cl.
CPC ........ *H04L 41/509* (2013.01); *H04L 47/2475* (2013.01); *H04L 47/38* (2013.01); *H04L 47/56* (2013.01); *H04L 65/403* (2013.01); *H04L 67/42* (2013.01); *H04M 3/5307* (2013.01); *H04M 3/5315* (2013.01); *H04M 7/0072* (2013.01); *H04N 7/15* (2013.01); *H04L 47/2416* (2013.01); *H04M 1/2535* (2013.01); *H04M 3/568* (2013.01)

(56) References Cited

U.S. PATENT DOCUMENTS

| | | | |
|---|---|---|---|
| 6,453,336 | B1* | 9/2002 | Beyda ............... H04L 29/06 709/204 |
| 6,970,479 | B2 | 11/2005 | Abrahamsson et al. |
| 7,009,935 | B2 | 3/2006 | Abrahamsson et al. |
| 7,084,898 | B1 | 8/2006 | Firestone et al. |
| 7,185,054 | B1* | 2/2007 | Ludwig ............... G06F 3/0482 348/E7.081 |
| 7,664,057 | B1* | 2/2010 | Wu ............... H04N 21/234318 370/260 |
| 2003/0091160 | A1 | 5/2003 | Enbom et al. |
| 2003/0221100 | A1* | 11/2003 | Russ ............... H04L 12/2805 713/153 |
| 2006/0047750 | A1* | 3/2006 | Schmitt ............... H04N 7/152 709/204 |
| 2006/0092269 | A1 | 5/2006 | Baird et al. |
| 2007/0071037 | A1 | 3/2007 | Abraham et al. |
| 2007/0169153 | A1 | 7/2007 | Zhang |
| 2007/0299981 | A1* | 12/2007 | Baird ............... G06Q 10/10 709/231 |
| 2008/0049947 | A1* | 2/2008 | Yoneda ............... H04R 3/02 381/73.1 |
| 2008/0071399 | A1 | 3/2008 | Baird |

FOREIGN PATENT DOCUMENTS

| | | |
|---|---|---|
| EP | 1290835 | 3/2003 |
| EP | 1299879 | 4/2003 |
| EP | 1440375 | 7/2004 |
| WO | 0148736 | 7/2001 |
| WO | 0186636 | 11/2001 |
| WO | 0186887 | 11/2001 |
| WO | 03029990 | 4/2003 |

\* cited by examiner

| Alice | | | | Bob | | | | Charlie | | | |
|---|---|---|---|---|---|---|---|---|---|---|---|
| Start audio clock time: | 1000 | | | Start audio clock time: | 1100 | | | Start audio clock time: | 1200 | | |
| Start video clock time: | 1100 | | | Start video clock time: | 1150 | | | Start video clock time: | 1240 | | |
| Audio interval: | 20 | | | Audio interval: | 20 | | | Audio interval: | 20 | | |
| Video interval: | 60 | | | Video interval: | 60 | | | Video interval: | 60 | | |
| Audio | | Video | | Audio | | Video | | Audio | | Video | |
| CT | ST | CT | ST | CT | ST | CT | ST | CT | ST | CT | ST |
| 1000 | 0 | 1100 | 0 | 1100 | 0 | 1150 | 0 | 1200 | 0 | 1240 | 0 |
| 1020 | 20 | 1160 | 60 | 1120 | 20 | 1210 | 60 | 1220 | 20 | 1300 | 60 |
| 1040 | 40 | 1220 | 120 | 1140 | 40 | 1270 | 120 | 1240 | 40 | 1360 | 120 |
| 1060 | 60 | 1280 | 180 | 1160 | 60 | 1330 | 180 | 1260 | 60 | 1420 | 180 |
| 1080 | 80 | 1340 | 240 | 1180 | 80 | 1390 | 240 | 1280 | 80 | 1480 | 240 |
| 1100 | 100 | 1400 | 300 | 1200 | 100 | 1450 | 300 | 1300 | 100 | 1540 | 300 |
| 1120 | 120 | 1460 | 360 | 1220 | 120 | 1510 | 360 | 1320 | 120 | 1600 | 360 |
| 1140 | 140 | 1520 | 420 | 1240 | 140 | 1570 | 420 | 1340 | 140 | 1660 | 420 |
| 1160 | 160 | 1580 | 480 | 1260 | 160 | 1630 | 480 | 1360 | 160 | 1720 | 480 |
| 1180 | 180 | 1640 | 540 | 1280 | 180 | 1690 | 540 | 1380 | 180 | 1780 | 540 |
| 1200 | 200 | 1700 | 600 | 1300 | 200 | 1750 | 600 | 1400 | 200 | 1840 | 600 |
| 1220 | 220 | 1760 | 660 | 1320 | 220 | 1810 | 660 | 1420 | 220 | 1900 | 660 |
| 1240 | 240 | 1820 | 720 | 1340 | 240 | 1870 | 720 | 1440 | 240 | 1960 | 720 |
| 1260 | 260 | 1880 | 780 | 1360 | 260 | 1930 | 780 | 1460 | 260 | 2020 | 780 |
| 1280 | 280 | 1940 | 840 | 1380 | 280 | 1990 | 840 | 1480 | 280 | 2080 | 840 |
| 1300 | 300 | 2000 | 900 | 1400 | 300 | 2050 | 900 | 1500 | 300 | 2140 | 900 |
| 1320 | 320 | 2060 | 960 | 1420 | 320 | 2110 | 960 | 1520 | 320 | 2200 | 960 |
| 1340 | 340 | 2120 | 1020 | 1440 | 340 | 2170 | 1020 | 1540 | 340 | 2260 | 1020 |
| 1360 | 360 | 2180 | 1080 | 1460 | 360 | 2230 | 1080 | 1560 | 360 | 2320 | 1080 |
| 1380 | 380 | 2240 | 1140 | 1480 | 380 | 2290 | 1140 | 1580 | 380 | 2380 | 1140 |
| 1400 | 400 | 2300 | 1200 | 1500 | 400 | 2350 | 1200 | 1600 | 400 | 2440 | 1200 |
| 1420 | 420 | 2360 | 1260 | 1520 | 420 | 2410 | 1260 | 1620 | 420 | 2500 | 1260 |
| 1440 | 440 | 2420 | 1320 | 1540 | 440 | 2470 | 1320 | 1640 | 440 | 2560 | 1320 |
| 1460 | 460 | 2480 | 1380 | 1560 | 460 | 2530 | 1380 | 1660 | 460 | 2620 | 1380 |
| 1480 | 480 | 2540 | 1440 | 1580 | 480 | 2590 | 1440 | 1680 | 480 | 2680 | 1440 |
| 1500 | 500 | 2600 | 1500 | 1600 | 500 | 2650 | 1500 | 1700 | 500 | 2740 | 1500 |
| 1520 | 520 | 2660 | 1560 | 1620 | 520 | 2710 | 1560 | 1720 | 520 | 2800 | 1560 |
| 1540 | 540 | 2720 | 1620 | 1640 | 540 | 2770 | 1620 | 1740 | 540 | 2860 | 1620 |
| 1560 | 560 | 2780 | 1680 | 1660 | 560 | 2830 | 1680 | 1760 | 560 | 2920 | 1680 |
| 1580 | 580 | 2840 | 1740 | 1680 | 580 | 2890 | 1740 | 1780 | 580 | 2980 | 1740 |
| 1600 | 600 | 2900 | 1800 | 1700 | 600 | 2950 | 1800 | 1800 | 600 | 3040 | 1800 |
| 1620 | 620 | 2960 | 1860 | 1720 | 620 | 3010 | 1860 | 1820 | 620 | 3100 | 1860 |
| 1640 | 640 | 3020 | 1920 | 1740 | 640 | 3070 | 1920 | 1840 | 640 | 3160 | 1920 |

FIG. 7

| Audio | | | Video | | |
|---|---|---|---|---|---|
| Type | Clock time | Stream time | Type | Clock time | Stream time |
| Sync | 1000 | 0 | Sync | 1100 | 0 |
| Data | | 0 | Data | | 0 |
| Data | | 20 | Data | | 60 |
| Data | | 40 | Data | | 120 |
| Data | | 60 | Data | | 180 |
| Data | | 80 | Data | | 240 |
| Data | | 100 | Data | | 300 |
| Data | | 120 | Data | | 360 |
| Data | | 140 | Data | | 420 |
| Data | | 160 | Data | | 480 |
| Data | | 180 | Data | | 540 |
| Data | | 200 | Data | | 600 |
| Data | | 220 | Data | | 660 |
| Data | | 240 | Data | | 720 |
| Data | | 260 | Data | | 780 |
| Data | | 280 | Data | | 840 |
| Data | | 300 | Data | | 900 |
| Data | | 320 | Data | | 960 |
| Data | | 340 | Sync | 2100 | 1000 |
| Data | | 360 | Data | | 1020 |
| Data | | 380 | Data | | 1080 |
| Data | | 400 | Data | | 1140 |
| Data | | 420 | Data | | 1200 |
| Data | | 440 | Data | | 1260 |
| Data | | 460 | Data | | 1320 |
| Data | | 480 | Data | | 1380 |
| Data | | 500 | Data | | 1440 |
| Data | | 520 | Data | | 1500 |
| Data | | 540 | Data | | 1560 |
| Data | | 560 | Data | | 1620 |
| Data | | 580 | Data | | 1680 |
| Data | | 600 | Data | | 1740 |
| Data | | 620 | Data | | 1800 |
| Data | | 640 | Data | | 1860 |

FIG. 8

| Video | | | | | | Audio | | | | | |
|---|---|---|---|---|---|---|---|---|---|---|---|
| Bob | | | Charlie | | | Data - Mix | | Sync - Bob | | Sync - Charlie | |
| Type | CT | ST | Type | CT | ST | CT | ST | CT | ST (mix) | CT | ST (mix) |
| Sync | 1150 | 0 | Sync | 1240 | 0 | | 500 | 1100 | 500 | 1200 | 500 |
| Data | | 0 | Data | | 0 | | 540 | 2100 | 1500 | 2200 | 1500 |
| Data | | 60 | Data | | 60 | | 580 | | | | |
| Data | | 120 | Data | | 120 | | 620 | | | | |
| Data | | 180 | Data | | 180 | | 660 | | | | |
| Data | | 240 | Data | | 240 | | 700 | | | | |
| Data | | 300 | Data | | 300 | | 740 | | | | |
| Data | | 360 | Data | | 360 | | 780 | | | | |
| Data | | 420 | Data | | 420 | | 820 | | | | |
| Data | | 480 | Data | | 480 | | 860 | | | | |
| Data | | 540 | Data | | 540 | | 900 | | | | |
| Data | | 600 | Data | | 600 | | 940 | | | | |
| Data | | 660 | Data | | 660 | | 980 | | | | |
| Data | | 720 | Data | | 720 | | 1020 | | | | |
| Data | | 780 | Data | | 780 | | 1060 | | | | |
| Data | | 840 | Data | | 840 | | 1100 | | | | |
| Data | | 900 | Data | | 900 | | 1140 | | | | |
| Data | | 960 | Data | | 960 | | 1180 | | | | |
| Sync | 2150 | 1000 | Sync | 2240 | 1000 | | 1220 | | | | |
| Data | | 1020 | Data | | 1020 | | 1260 | | | | |
| Data | | 1080 | Data | | 1080 | | 1300 | | | | |
| Data | | 1140 | Data | | 1140 | | 1340 | | | | |
| Data | | 1200 | Data | | 1200 | | 1380 | | | | |
| Data | | 1260 | Data | | 1260 | | 1420 | | | | |
| Data | | 1320 | Data | | 1320 | | 1460 | | | | |
| Data | | 1380 | Data | | 1380 | | 1500 | | | | |
| Data | | 1440 | Data | | 1440 | | 1540 | | | | |
| Data | | 1500 | Data | | 1500 | | 1580 | | | | |
| Data | | 1560 | Data | | 1560 | | 1620 | | | | |
| Data | | 1620 | Data | | 1620 | | 1660 | | | | |
| Data | | 1680 | Data | | 1680 | | 1700 | | | | |
| Data | | 1740 | Data | | 1740 | | 1740 | | | | |
| Data | | 1800 | Data | | 1800 | | 1780 | | | | |
| Data | | 1860 | Data | | 1860 | | 1820 | | | | |

FIG. 9

| Audio mix | | | Bob's video | | Charlie's video | |
|---|---|---|---|---|---|---|
| Stream time | Bob clock time | Charlie clock time | Stream time | Clock time | Stream time | Clock time |
| 500 | 1100 | 1200 | 0 | 1100 | 0 | 0 |
| 540 | 1140 | 1240 | 60 | 1160 | 0 | 0 |
| 580 | 1180 | 1280 | 120 | 1220 | 0 | 1200 |
| 620 | 1220 | 1320 | 180 | 1280 | 60 | 1260 |
| 660 | 1260 | 1360 | 240 | 1340 | 120 | 1320 |
| 700 | 1300 | 1400 | 300 | 1400 | 180 | 1380 |
| 740 | 1340 | 1440 | 360 | 1460 | 240 | 1440 |
| 780 | 1380 | 1480 | 420 | 1520 | 300 | 1500 |
| 820 | 1420 | 1520 | 480 | 1580 | 360 | 1560 |
| 860 | 1460 | 1560 | 540 | 1640 | 420 | 1620 |
| 900 | 1500 | 1600 | 600 | 1700 | 480 | 1680 |
| 940 | 1540 | 1640 | 660 | 1760 | 540 | 1740 |
| 980 | 1580 | 1680 | 720 | 1820 | 600 | 1800 |
| 1020 | 1620 | 1720 | 780 | 1880 | 660 | 1860 |
| 1060 | 1660 | 1760 | 840 | 1940 | 720 | 1920 |
| 1100 | 1700 | 1800 | 900 | 2000 | 780 | 1980 |
| 1140 | 1740 | 1840 | 960 | 2060 | 840 | 2040 |
| 1180 | 1780 | 1880 | 1020 | 2120 | 900 | 2100 |
| 1220 | 1820 | 1920 | 1080 | 2180 | 960 | 2160 |
| 1260 | 1860 | 1960 | 1140 | 2240 | 1020 | 2220 |
| 1300 | 1900 | 2000 | 1200 | 2300 | 1080 | 2280 |
| 1340 | 1940 | 2040 | 1260 | 2360 | 1140 | 2340 |
| 1380 | 1980 | 2080 | 1320 | 2420 | 1200 | 2400 |
| 1420 | 2020 | 2120 | 1380 | 2480 | 1260 | 2460 |
| 1460 | 2060 | 2160 | 1440 | 2540 | 1320 | 2520 |
| 1500 | 2100 | 2200 | 1500 | 2600 | 1380 | 2580 |

FIG. 10

VIDEO CONFERENCING OVER IP NETWORKS

CROSS-REFERENCE TO RELATED APPLICATIONS

This application is a continuation of U.S. patent application Ser. No. 15/495,734, filed Apr. 24, 2017, which is a continuation of U.S. patent application Ser. No. 14/935,987, filed Nov. 9, 2015, now U.S. Pat. No. 9,635,315, which is a continuation-in-part of U.S. patent application Ser. No. 14/507,405, filed Oct. 6, 2014, now U.S. Pat. No. 9,185,347, which is a continuation of U.S. patent application Ser. No. 11/890,382, filed Aug. 6, 2007, now U.S. Pat. No. 8,856,371, which claims benefit of U.S. Provisional Patent Application 60/835,998, filed Aug. 7, 2006, the disclosures of all which are incorporated herein by reference in entirety for all purposes.

TECHNICAL FIELD

The present invention relates generally to video teleconferencing, and specifically to methods and systems for video teleconferencing over packet networks.

BACKGROUND

Video teleconferencing (also known simply as video conferencing) is well known in the art as a means for allowing remote parties to participate in a discussion. Voice, video, and optionally other data are transmitted between the parties over a communication network, such as the Internet, LANs, and/or telephone lines. The parties are able to see, speak to and hear the other parties simultaneously over audio and video channels.

Early video conferencing systems used dedicated hardware systems and ISDN lines for communication among the conference parties. More recently, however, low-cost software-based solutions have become available for video conferencing over Internet Protocol (IP) packet networks. Systems of this sort include Microsoft® NetMeeting and Windows® Live Messenger, Yahoo!® Messenger, and Skype®.

SUMMARY

Embodiments of the present invention that are described herein below provide methods, systems and software for use in packet-based video teleconferencing. These methods permit client computers to exchange video images and audio data via a server on the Internet or other packet network in a multipoint-to-multipoint conference. Alternatively, point-to-point conferences, with or without a dedicated server, are also supported. The server receives and transmits synchronization information from and to the client computers, along with video images and mixed audio data. The client computers use this information in synchronizing the individual video images captured by the other client computers with the mixed audio data, for output to users.

There is therefore provided, in accordance with an embodiment of the present invention, a method for communication, including:

establishing communication links over a packet network between a server and plurality of client computers that are to participate in a video teleconference;

receiving at the server from the client computers uplink audio packets and uplink video packets, which respectively contain audio and video data captured by each of the client computers;

mixing the audio data from the uplink audio packets at the server so as to create respective streams of mixed audio data for transmission to the client computers;

transmitting from the server to the client computers downlink audio packets containing the respective streams of mixed audio data;

relaying the video data from the server to the client computers in downlink video packets;

receiving and synchronizing the video data with the mixed audio data at the client computers; and outputting the synchronized video and mixed audio data to a respective user of each of the client computers.

In a disclosed embodiment, establishing the communication links includes establishing respective first and second communication links between first and second client computers and a server over the packet network using different, respective first and second transport layer protocols.

Additionally or alternatively, establishing the communication links includes establishing a first communication link between a server or client computer and establishing a concurrent second communication link between a different server or directly with another client computer.

In some embodiments, receiving the uplink video packets includes controlling a quality of the video data conveyed to the server by the client computers by transmitting instructions from the server to the client computers. In one embodiment, transmitting the instructions includes receiving messages from the client computers that are indicative of downlink bandwidth availability for transmission from the server to the client computers, and determining the quality of the video data responsively to the downlink bandwidth availability. Typically, receiving the messages includes detecting, at one of the client computers, a delay in receiving one or more of the downlink audio and video packets, and informing the server of the delay, and transmitting the instructions includes instructing the clients to reduce the quality of the video data transmitted in the uplink video packets responsively to detecting the delay at the one of the clients.

Additionally or alternatively, controlling the quality includes instructing the client computers to increase or decrease at least one quality parameter selected from a group of quality parameters consisting of an image resolution, a degree of image compression, a frame rate and a bandwidth.

Additionally or alternatively, controlling the quality includes determining the optimal bandwidth setting for each client computer separately by determining the minimum and maximum bandwidth of each client computer and constructing a linear programming model to generate the optimal bandwidth for each client computer.

Additionally or alternatively, receiving the uplink packets includes detecting, at the server, a delay in the audio data, and eliminating an interval of silent audio data in order to compensate for the delay. In one embodiment, eliminating the interval includes marking, at one or more of the client computers, at least one block of the audio data as a silent block, and eliminating the silent block from the mixed audio data.

In some embodiments, each of the downlink video packets contains the video data captured by a respective one of the client computers. In one embodiment, outputting the synchronized video and mixed audio data includes displaying the video data captured by the respective one of the client computers in a respective window among multiple windows displayed by each of the client computers. Typically, synchronizing the video data includes controlling, at the client computer, the multiple windows so that the video data conveyed from each of the client computers are synchronized with the mixed audio data. Additionally or alternatively, relaying the video data includes passing the video data from the uplink video packets to the downlink video packets without transcoding of the video data at the server.

In a disclosed embodiment, receiving the uplink audio and video packets includes receiving at the server synchronization data from each of the client computers, and including generating synchronization information at the server based on the synchronization data, and transmitting the synchronization information from the server to the client computers for use in synchronizing the video data with the mixed audio data.

Typically, the plurality of client computers includes at least three client computers that participate in the video teleconference.

There is also provided, in accordance with an embodiment of the present invention, a method for communication, including:

establishing a first communication link between a first client computer and a server over a packet network using a first transport layer protocol;

establishing a second communication link between a second client computer and the server over the packet network using a second transport layer protocol, which is different from the first transport layer protocol; and exchanging audio and video data packets in a video teleconference between the first and second client computers via the server using the first and second transport layer protocols respectively over the first and second links.

In a disclosed embodiment, the first transport layer protocol is a Transmission Control Protocol (TCP), and the second transport layer protocol is a User Datagram Protocol (UDP), and establishing the first communication link includes opening a secure socket between the client computer and the server.

Alternatively, the first communication link is a unicast link, and the second communication link is a multicast link.

There is additionally provided, in accordance with an embodiment of the present invention, a method for communication, including:

configuring a first client computer to run a server program in a video teleconferencing application;

establishing a communication link over a packet network between the server program running on the first client computer and at least a second client computer; and exchanging audio and video data packets via the server program in a video teleconference between the first and at least the second client computer using client programs running on the client computers.

Typically, configuring the first client computer includes deciding, using the video teleconferencing application, whether to use the server program on the first client computer or a remote server in conducting the video teleconference.

There is further provided, in accordance with an embodiment of the present invention, communication apparatus, including:

a plurality of client computers, which are connected to communicate over a packet network and are configured to capture audio and video data and to transmit over the packet network uplink audio packets and uplink video packets, which respectively contain the audio and video data; and a conference server, which is coupled to establish communication links over the packet network with the client computers that are to participate in a video teleconference and to receive the uplink audio packets and uplink video packets over the communication links, and which is configured to mix the audio data from the uplink audio packets so as to create respective streams of mixed audio data for transmission to the client computers, and to transmit to the client computers downlink audio packets containing the respective streams of mixed audio data while relaying the video data from the uplink video packets to the client computers in downlink video packets, wherein the client computers are configured to synchronize the video data with the mixed audio data, and to output the synchronized video and mixed audio data to a respective user of each of the client computers.

There is moreover provided, in accordance with an embodiment of the present invention, a conference server, including:

a network interface, which is coupled to establish communication links over a packet network with a plurality of client computers that are to participate in a video teleconference, and to receive from the client computers uplink audio packets and uplink video packets, which respectively contain audio and video data captured by each of the client computers; and a processor, which is configured to mix the audio data from the uplink audio packets so as to create respective streams of mixed audio data for transmission to the client computers, and to transmit to the client computers via the network interface downlink audio packets containing the respective streams of mixed audio data while relaying the video data from the uplink video packets to the client computers in downlink video packets, for synchronization by the client computers with the mixed audio data.

There is furthermore provided, in accordance with an embodiment of the present invention, a conference server, including:

a network interface, which is coupled to communicate over a packet network with a plurality of client computers; and a processor, which is configured to establish, via the network interface, a first communication link with a first client computer using a first transport layer protocol, and a second communication link with a second client computer using a second transport layer protocol, which is different from the first transport layer protocol, and to exchange audio and video data packets in a video teleconference between the first and second client computers using the first and second transport layer protocols respectively over the first and second links.

There is also provided, in accordance with an embodiment of the present invention, communication apparatus, including first and second client computers, which are coupled to communicate with one another over a packet network, wherein the first client computer is configured to run a server program in a video teleconferencing application, to establish a communication link over the packet network between the server program running on the first client computer and the second client computer, and to exchange audio and video data packets via the server program in a video teleconference between the first and second client computers using client programs running on the first and second client computers.

There is additionally provided, in accordance with an embodiment of the present invention, a computer software product, including a computer-readable medium in which program instructions are stored, which instructions, when read by a server, cause the server to establish communication links over a packet network with a plurality of client computers that are to participate in a video teleconference, and to receive from the client computers uplink audio packets and uplink video packets, which respectively contain audio and video data captured by each of the client computers, wherein the instructions cause the server to mix the audio data from the uplink audio packets so as to create respective streams of mixed audio data for transmission to the client computers, and to transmit to the client computers via the network interface downlink audio packets containing the respective streams of mixed audio data while relaying the video data from the uplink video packets to the client computers in downlink video packets, for synchronization by the client computers with the mixed audio data.

There is further provided, in accordance with an embodiment of the present invention, a computer software product, including a computer-readable medium in which program instructions are stored, which instructions, when read by a client computer that is to participate in a video teleconference, cause the client computer to establish a communication link over a packet network with a conference server, and to transmit uplink audio packets and uplink video packets, which respectively contain audio and video data captured by the client computer, wherein the instructions cause the client computer to receive from the server downlink audio packets containing the a stream of mixed audio data generated by the server and to receive downlink video packets containing the video data transmitted by other client computers in the video teleconference, and to synchronize the video data with the mixed audio data for output to a respective user of each of the client computers.

There is moreover provided, in accordance with an embodiment of the present invention, a client computer, including:

a user interface; and a processor, which is configured to establish a communication link over a packet network with a conference server so as to participate in a video teleconference, and to transmit uplink audio packets and uplink video packets, which respectively contain audio and video data captured by the client computer, wherein the processor is configured to receive from the server downlink audio packets containing the a stream of mixed audio data generated by the server and to receive downlink video packets containing the video data transmitted by other client computers in the video teleconference, and to synchronize the video data with the mixed audio data for output via the user interface.

There is furthermore provided, in accordance with an embodiment of the present invention, a computer software product, including a computer-readable medium in which program instructions are stored, which instructions, when read by a server, cause the server to establish, via a packet network, a first communication link with a first client computer using a first transport layer protocol, and to establish, via the packet network, a second communication link with a second client computer using a second transport layer protocol, which is different from the first transport layer protocol, and to exchange audio and video data packets in a video teleconference between the first and second client computers using the first and second transport layer protocols respectively over the first and second links.

There is also provided, in accordance with an embodiment of the present invention, a computer software product, including a computer-readable medium in which program instructions are stored, which instructions, when read by a first client computer, cause the first client to run a server program in a video teleconferencing application, to establish a communication link over a packet network between the server program running on the first client computer and a second client computer, and to exchange audio and video data packets via the server program in a video teleconference between the first and second client computers using client programs running on the first and second client computers.

In some embodiments, a method is provided comprising: establishing, by at least one processor of a first computing device, a first communication link over a network between the first computing device and a communications server; receiving, by the at least one processor and from the communications server, data associated with a video conference application associated with initiating a video conference between the first computing device and a second computing device; establishing, by the at least one processor and using the video conference application, a second communication link, over the network or a second network, between the first computing device and the second computing device; transmitting, by the at least one processor, audio and video packets via the second communication link, wherein the audio and video packets respectively comprise audio and video data; and transmitting, by the at least one processor, synchronization packets via the second communication link, wherein the audio and video data are synchronized for output at the second computing device based on synchronization information comprised in the synchronization packets.

In some embodiments, the method further comprises establishing, by the at least one processor, a third communication link, over the network or the second network, between the first computing device and a third computing device, wherein each of the first, second, and third computing devices are enabled to participate in the video conference.

In some embodiments, the audio and video packets comprise or are comprised in the synchronization packets.

In some embodiments, the audio and video packets are transmitted substantially simultaneously with the synchronization packets.

In some embodiments, the method further comprises transmitting, by the at least one processor, a first codec for the second computing device, wherein the first codec is used by the second computing device to decode at least one of the audio and video data.

In some embodiments, the first computing device comprises a first mobile phone, and wherein the second computing device comprises a second mobile phone.

In some embodiments, the method further comprises receiving, by the at least one processor via the second communication link, second audio packets, second video packets, and second synchronization packets, wherein the second audio and video packets respectively comprise second audio and second video data, and wherein the second audio and second video data are synchronized for output at the first computing device based on second synchronization information comprised in the second synchronization packets.

In some embodiments, the method further comprises a non-transitory computer-readable medium is provided comprising code that, when executed, causes at least one processor of a first computing device to perform the operations of: establishing, by the at least one processor, a first communication link over a network between a first computing device and a communications device; receiving, by the at least one processor, data associated with a video conference operation initiated or to be initiated between the first computing device and a second computing device; establishing, by the at least one processor, a second communication link, over the network or a second network, between the first computing device and the second computing device; transmitting, by the at least one processor, audio and video data; and transmitting, by the at least one processor and to the second computing device via the second communication link, synchronization data, wherein output of the audio and video data at the second computing device is synchronized based on the synchronization data.

In some embodiments, the code, when executed, causes the at least one processor to perform the operations of establishing, by the at least one processor, a third communication link, over the network or a second network, between the first computing device and a third computing device, wherein each of the first, second, and third computing devices is enabled to participate in a three-way video conference.

In some embodiments, the three-way video conference is initiated by at least one of the first computing device or the second computing device.

In some embodiments, the audio data is comprised in a first packet, wherein the video data is comprised in the first packet or a second packet, and wherein the synchronization data is comprised in the first packet, or the second packet, or a third packet.

In some embodiments, the code, when executed, causes the at least one processor to perform the operations of: selecting, by the at least one processor, a first codec for the second computing device; and transmitting, by the at least one processor, the first codec to the second computing device, wherein the first codec is used by the second computing device to decode at least one of the audio data or the video data.

In some embodiments, the video conference operation is part of a mobile application.

In some embodiments, the code, the audio and video data are transmitted either substantially simultaneously with or separately from the synchronization data.

In some embodiments, a first computing device is provided comprising: at least one memory comprising instructions; and at least one processor configured to execute the instructions, wherein executing the instructions causes the at least one processor to perform the operations of: establishing, by the at least one processor, a first communication link over a network between a first computing device and a communications system; receiving, by the at least one processor and from the communications system, data associated with a video conference application associated with initiating a video conference between the first computing device and a second computing device; establishing, by the at least one processor, a second communication link, over the network or a second network, between the first computing device and the second computing device; transmitting, by the at least one processor and to the second computing device via the second communication link, audio and video data; and transmitting, by the at least one processor and to the second computing device via the second communication link, synchronization packets, wherein the audio and video data are output at the second computing device based on synchronization information comprised in the synchronization packets.

In some embodiments, executing the instructions further causes the at least one processor to perform the operations of establishing, by the at least one processor, a third communication link over the network between the first computing device and a third computing device, wherein each of the first, second, and third computing devices is enabled to participate in the video conference.

In some embodiments, the third communication link is established using the video conference application.

In some embodiments, executing the instructions further causes the at least one processor to perform the operations of: transmitting, by the at least one processor, the audio and video data via the third communication link; and transmitting, by the at least one processor, the synchronization packets via the third communication link, wherein the audio and video data are synchronized for output at the third computing device based on the synchronization information.

In some embodiments, executing the instructions further causes the at least one processor to perform the operations of: selecting, by the at least one processor, a first codec for the second computing device; and transmitting, by the at least one processor, the first codec to the second computing device.

In some embodiments, the video communications system comprises, is, or is comprised in the second computing device, or wherein executing the instructions further causes the at least one processor to perform the operations of: receiving, by the at least one processor via the second communication link, second audio and video data, and second synchronization packets, and wherein the second audio and second video data are output at the first computing device based on synchronization information comprised in the second synchronization packets.

BRIEF DESCRIPTION OF THE DRAWINGS

The present invention will be more fully understood from the following detailed description of the embodiments thereof, taken together with the drawings in which:

FIG. 7 is a table showing the timing of audio and video data transmitted by client computers in a video teleconference, in accordance with an embodiment of the present invention;

FIG. 8 is a table showing messages sent to a server by a client computer in a video teleconference, in accordance with an embodiment of the present invention;

FIG. 9 is a table showing messages sent from a server to a client computer in a video teleconference, in accordance with an embodiment of the present invention; and FIG. 10 is a table showing timing of audio and video data frames received by a client computer in a video teleconference, in accordance with an embodiment of the present invention.

DETAILED DESCRIPTION

Figure 1:
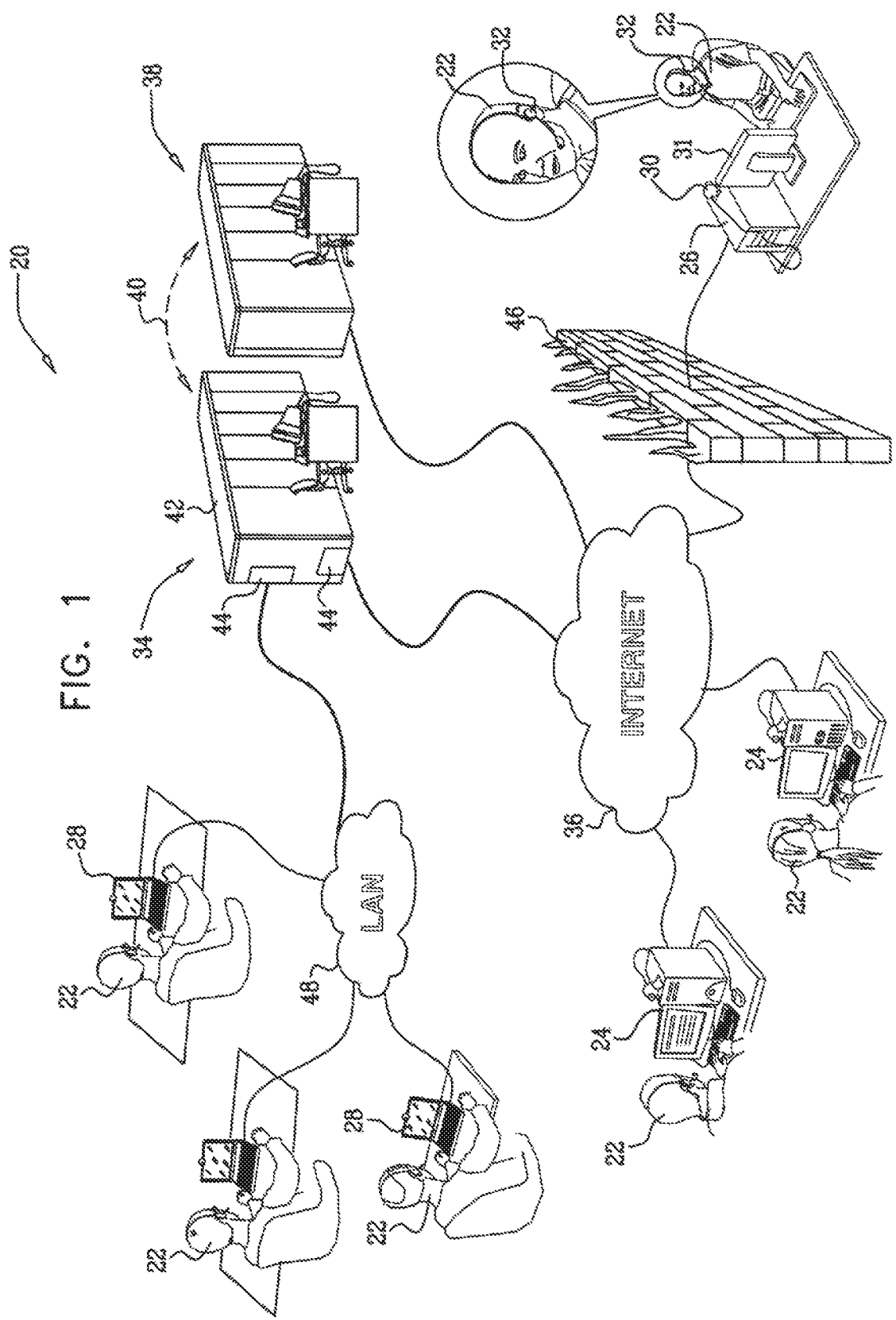
FIG. 1 is a schematic, pictorial illustration of a system for video teleconferencing, in accordance with an embodiment of the present invention.

FIG. 1 is a schematic, pictorial illustration of a system 20 for video teleconferencing, in accordance with an embodiment of the present invention. Users 22 access the system via client computers 24, 26, 28, which are typically equipped with suitable user interface components, including a video camera 30, a display monitor 31, and audio input/output (I/O) components 32. (In the description that follows, client computers are alternatively referred to simply as "clients.") Client computers 24 and 26 communicate with a conference server 34 via a packet network 36, such as the public Internet. Optionally, users may also communicate with the conference server and participate in the conference using a telephone handset (not shown) via a switched telephone network, such as a land or mobile network.

In some embodiments, a separate management server 38, similarly coupled to network 36, may be used for management tasks, such as tracking the client computers and/or users who are participating in each conference and conveying management messages (as opposed to audio and video data) to and from the client computers. For these purposes, servers 34 and 38 are typically connected by a communication link 40, which may be either in-band (via network 36) or out-of-band.

In some embodiments, client computers maintain a concurrent, secondary connection with the server or other client computers during the video teleconference. The ability to maintain a concurrent, secondary connection provides a multitude of benefits to enhance the quality and reliability of the conferencing system.

Server 34 (and likewise server 38) typically comprises a general-purpose computer processor 42, with suitable interfaces 44 to the network or networks on which the client computers are located. Client computers 24, 26, 28 may likewise comprise general-purpose computers, such as desktop or laptop computers, or may alternatively comprise portable computing devices with wireless communication interfaces and with sufficient computing power and suitable user interface components for performing the functions that are described herein. Processor 42 and client computers 24, 26, 28 perform the functions that are described herein under the control of software, which may be downloaded in electronic form (over a network, for example), or may be provided on tangible media, such as optical, magnetic or electronic memory media.

Video teleconferencing requires real-time, two-way transmission of video and audio data. In the Internet environment, this requirement may be complicated by intermediary components, such as a firewall 46. Firewalls are used, as is known in the art, to prevent malicious traffic on network 36 from reaching client computer 26. For this purpose, the firewall may prevent packets that are sent using simple, connectionless transport level protocols, such as the User Datagram Protocol (UDP), from reaching computer 26. UDP could otherwise be used conveniently and efficiently for transmitting real-time data. Other sorts of intermediary components, such as proxy servers (not shown), may cause similar sorts of problems. In such cases, it may be necessary for the server to use a connection-oriented transport level protocol, such as the Transmission Control Protocol (TCP), or possibly even a secure socket to transmit audio and video data downstream to the client computer. (In the present patent application and in the claims, the terms "downstream" and "downlink" are used in the conventional sense to refer to transmission of data packets from a server to a client, while "upstream" and "uplink" refer to transmission from a client to a server.)

Server 34 is configured, as described herein below, to determine the appropriate and most efficient transport layer protocol to use for each client computer in a given video teleconference. The server may thus use TCP, with or without a secure socket, to communicate with one client computer in a given conference, while using UDP to communicate with another client computer in the same conference. The client computers are typically not aware of these differences in transport layer protocol. Thus, system 20 supports both point-to-point and multipoint-to-multipoint conferences in which different client computers simultaneously use different transport layer protocols.

In the example shown in FIG. 1, client computers 28 are connected to server 34 via a local area network (LAN) 48. This configuration permits server to transmit downlink packets to these client computers using a multicast or broadcast protocol. Optionally, interface 44 to LAN 48 may comprise multiple network interface cards, each configured to communicate with a respective subnet, in which case server 34 may transmit downlink packets simultaneously to several multicast groups on different subnets. Multicast and broadcast have the advantage of high efficiency in utilization of network resources, but they operate only in the downlink direction, not uplink. Client computers 28 may thus watch and listen by multicast or broadcast to a video teleconference involving one or more of client computers 24 and 26 on network 36. If one or more of client computers 28 are to participate actively in the conference, however, they will typically have to use a different, unicast protocol for uplink communication with server 34.

Figure 2:
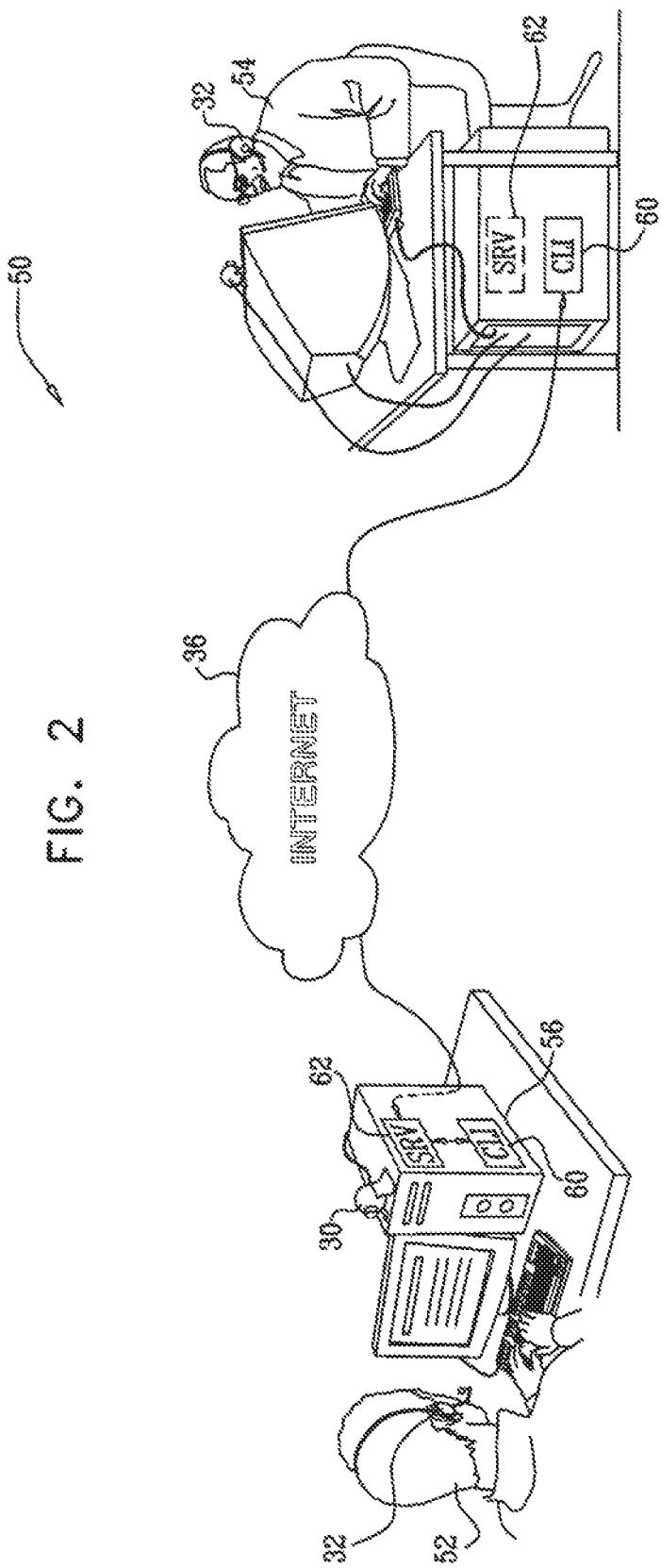
FIG. 2 is a schematic, pictorial illustration of a system for video teleconferencing, in accordance with another embodiment of the present invention.

FIG. 2 is a schematic, pictorial illustration of a system 50 for video teleconferencing, in accordance with another embodiment of the present invention. In this example, users 52 and 54 of respective computers 56 and 58 conduct a point-to-point video teleconference over network 36, with computer 56 acting as both client and server. The principles of this embodiment may similarly be applied in multipoint-to-multipoint conferencing, as long as the computer acting as the server has sufficient computing power to support multiple clients.

The teleconferencing software that is installed on computers 56 and 58 includes both a client component 60 and a server component 62. Client component 60 is configured to communicate with an external, remote server (such as server 34 in FIG. 1) for purposes of setting up the video teleconference and exchanging video and audio data. In this mode of operation, server component 62 is dormant. In some circumstances, however, such as when user 52 initiates a point-to-point teleconference, client component 60 may decide to use server component 62 as a local server to set up the conference and exchange data with computer 58. Alternatively, server 34 may instruct client component 60 to use server component 62 when the client component contacts the server to establish the video teleconference. In either case, this sort of local server operation is advantageous in reducing packet transmission delays between computers 56 and 58, since the packets are transmitted directly between the two computers, rather than relayed through server 34. This use of local servers also reduces the load on server 34.

When client component 60 invokes server component 62, the server component starts to run and emulates the operation of remote server 34. In other words, server component 62 communicates with client component 60 on computer 58 to invite user 54 to join the video teleconference, and then transmits and receives audio and video packets to and from computer 58 via network 36 in the same manner as does server 34. The client component on computer 58 need not be aware that it is communicating with a local server on computer 56, rather than a remote server. Within computer 56, the client and server components pass data one to the other using an internal transport protocol, rather than over a network, but the principles of operation of the client and server components remain the same.

Thus, although the methods that are described herein below make reference specifically, for the sake of clarity, to the elements of system 20 (FIG. 1), these methods may likewise be applied, mutatis mutandis, in system 50, as well as in other point-to-point, point-to-multipoint, and multipoint-to-multipoint conferencing topologies.

Figure 3:
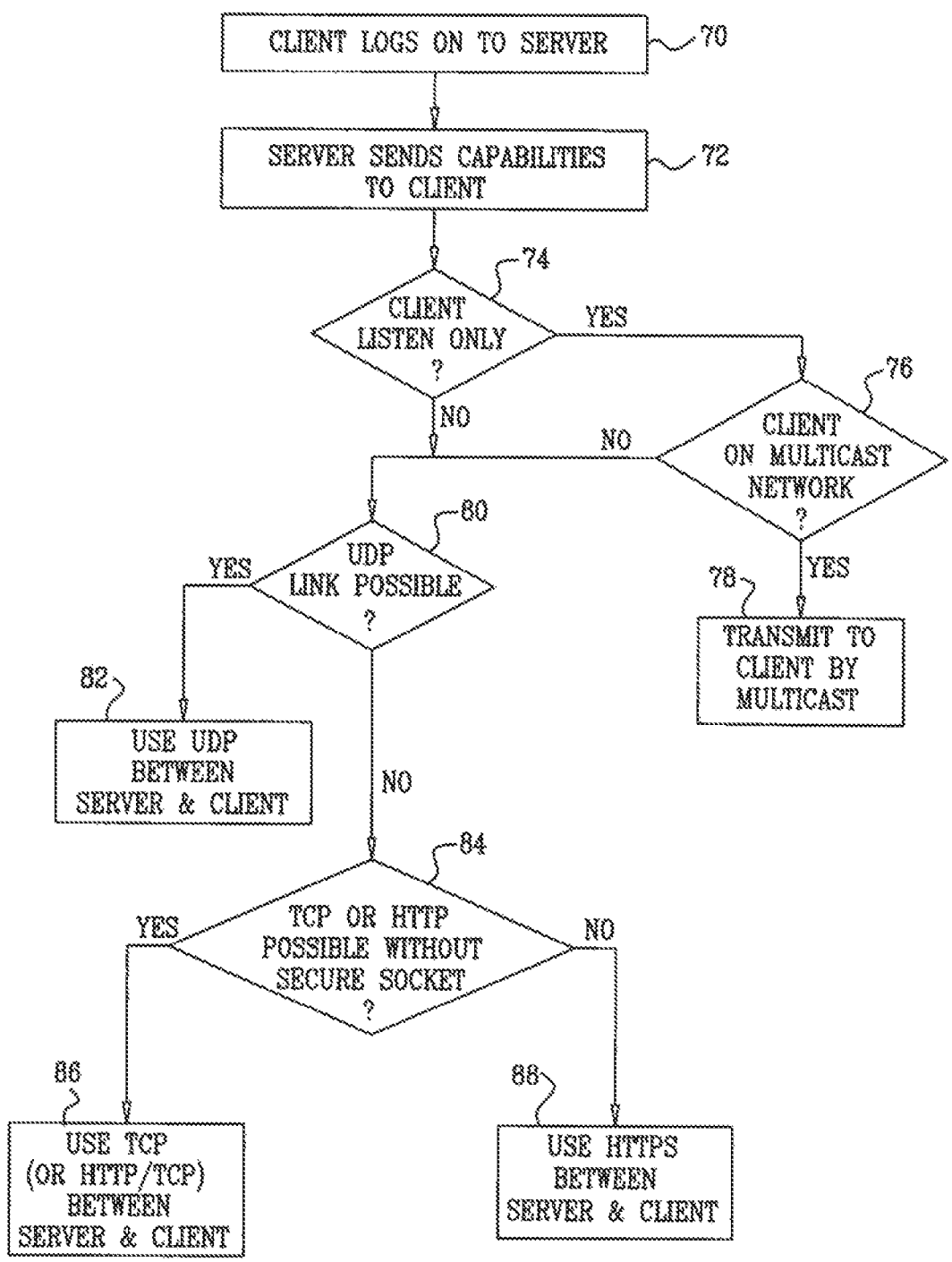
FIG. 3 is a flow chart that schematically illustrates a method for initiating a video teleconference, in accordance with an embodiment of the present invention

FIG. 3 is a flow chart that schematically illustrates a method for initiating a video teleconference, in accordance with an embodiment of the present invention. The method is initiated when a client computer logs on to server 34 (or server 38, depending on the system configuration), at a log-on step 70. For secure, reliable log-on and avoidance of problems due to components such as firewalls and proxies, the client computer may use a secure connection to the server. For example, the client computer may use the Hypertext Transfer Protocol (HTTP) over a Secure Socket Layer (SSL), commonly referred to as HTTPS, at step 70.

In response to the client log-on, server 34 sends one or more capabilities messages to the client, at a capability determination step 72. These messages tell the client which protocols and codecs (video and audio) the server can support, and may also indicate the IP address and port that the client should use in communicating with the server. The client chooses a protocol and codec according to its own capabilities and notifies the server of its choice. Different clients in the same conference may use different codecs, within the decoding capabilities of the server and the other clients.

In order to choose the transport protocol to use in communication with the client in a given teleconference, the client informs server 34 whether the client is going to be an active participant or will be listening only, at a status determination step 74. For listen-only clients, the server ascertains whether the client is connected to the server via a multicast-capable network (such as LAN 48), at a multicast checking step 76. If so, the server instructs the client to join the appropriate multicast group for the video teleconference, and subsequently transmits downlink audio and video data packets to this client by multicast, at a multicast step 78. In an alternative embodiment, not shown in this figure, the server may be configured to transmit downlink packets to a given client or clients via multicast, while receiving uplink packets from such clients using a unicast transport protocol.

When multicast is unavailable or inappropriate, server 34 checks whether UDP can be used in communication with this client, at a UDP checking step 80. For this purpose, for example, the server may transmit a sequence of UDP packets to the client and request that the client respond to the UDP packets that it receives. On this basis, the server determines how many of the UDP packets were lost en route. (If a component such as firewall 46 blocks the UDP packets, then all the packets will be lost.) If the number of UDP packets lost is less than a small, predetermined threshold percentage, the server concludes that a UDP link can be used effectively for communicating with this client, at a UDP selection step 82. Because UDP is connectionless and does not require acknowledgment, it generally gives lower delay in packet delivery than connection-oriented protocols.

As the next alternative, the server may attempt to establish a TCP connection, and to communicate with the client using the TCP connection without a secure socket, at a TCP checking step 84. Some intermediary components, such as firewalls, may be configured to allow any TCP connection to be established between the server and the client, while others may allow only HTTP messages to be transmitted over such a TCP connection. If the server is successful in setting up a non-secured TCP connection with the client (with or without HTTP), the server will then use such TCP connections for exchanging audio and video data with the client during the video teleconference, at a TCP selection step 86. When possible, the server may give preference to using TCP without HTTP, in order to avoid possible delays in packet delivery that may be caused by HTTP proxy servers.

Otherwise, the server will establish and use HTTPS for conveying audio and video packets to and from the client, at a HTTPS selection step 88. HTTPS incurs greater overhead than the other protocols noted above, but it has the advantage of passing data without interruption through nearly all firewalls, proxies and other intermediary components. Normally, HTTPS messages are conveyed as an encrypted payload within a TCP datagram. Once the HTTPS connection between the server and the client is established, however, packets with substantially any sort of payload (encrypted or not) will be conveyed through intermediary devices as long as they have the appropriate TCP/SSL header. The server and client may thus insert audio and video data in the payload of each of these packets in a proprietary format, rather than using conventional HTTP requests and replies.

In other embodiments, client computers may establish concurrent, secondary connections to enhance the quality and reliability of the video teleconference. In one embodiment, client computers may attempt to establish a peer to peer (p2p) connection with other client computers of the same video teleconference. Once a p2p connection is established, the client computers may stop sending audio and video packets to the server 34 and start sending the packets through the p2p connection. Unlike traditional p2p based communication systems, the conferencing system of the current embodiment starts a call via the server-based connection, which typically yields much faster call connection times than p2p connections. Also unlike traditional p2p systems, in conferencing system of the current embodiment, the client computer does not drop its connection with the server 34 even after it has switched to sending the audio and video packets through the p2p channel. This allows the client computers to switch to the server-based connection with no disruption to the user's video teleconference experience if the p2p connection fails. The client computers can then switch back to the p2p channel when it is reestablished. This switching provides a seamless video teleconference.

In another embodiment, client computers in a video teleconference may maintain a concurrent, secondary connection to a second server that is a backup to the primary server. If the primary server becomes unavailable during the video teleconference, client computers can seamlessly switch to using connections with the second server to continue the video teleconference. Client computers can also either switch back to the primary server when the connections are reestablished, or treat the second server as the new primary server and in parallel establish second connections to a new second server.

In another embodiment, a client computer may send and receive traffic via both the primary and secondary connections simultaneously in a video teleconference. For example, the client computer may use this approach to achieve greater end-to-end throughput between two client computers.

In embodiments using multiple connections, the handoff and synchronization of the media traffics between the first and second connections during a video teleconference can be achieved in many different ways. As an example, each packet could contain a sequence number when sent from a source such as a client computer or server. A centralized network jitter buffer could be included in the receiver side of each client computer. The centralized network jitter buffer would receive packets from the same source but via different connections. The centralized network jitter buffer would then pool the packets into a single jitter buffer where the packets would be buffered and sorted based on their assigned sequence number. A single sorted sequence of packets would then be supplied for subsequent processing steps at the client computer.

Figure 4:
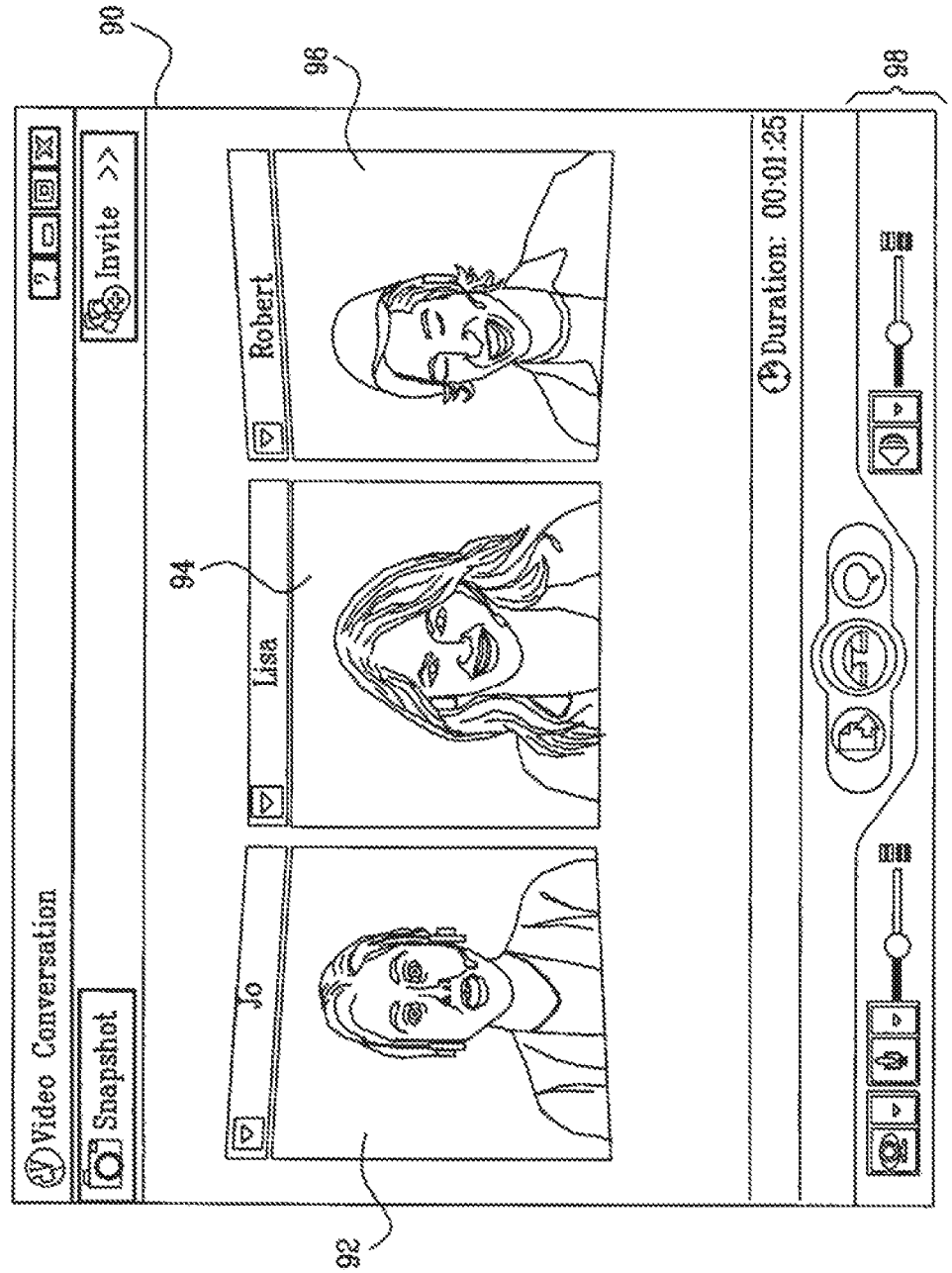
FIG. 4 is a schematic representation of a screen displayed by a client computer in a video teleconference, in accordance with an embodiment of the present invention.

FIG. 4 is a schematic representation of a screen 90 displayed by a client computer in a video teleconference, in accordance with an embodiment of the present invention. The screen comprises multiple windows 92, 94, 96, each of which is fed with video data conveyed by server 34 from a different client computer. In other words, each of the client computers participating in the video teleconference transmits uplink video packets, which the server then relays to the other client computers in the video teleconference for display in the respective windows. At the same time, the server mixes the uplink audio data from these client computers to create mixed audio downlink packets. Thus, for example, the client computer that displays screen 90 will receive separate video packets representing each of the individual images to be displayed in windows 92, 94 and 96, as transmitted by the other client computers in the video teleconference, and will receive audio packets containing a mix of the uplink audio data transmitted by these client computers. To display screen 90, the client computer synchronizes the images in windows 92, 94 and 96 with the mixed audio data, as described in detail herein below.

Screen 90 also includes on-screen controls 98, which enable the user of the client computer to interact with the teleconferencing software. For example, the controls may comprise an "invite" button, which brings up a list of contacts and their availability. The user may select contacts to invite to a teleconference, whereupon the client computer attempts to establish communications with the contacts (using a model similar to instant messaging and Internet voice services). Other controls may permit the user to mute uplink voice, block uplink video, leave the video teleconference, and perform other sorts of functions that will be apparent to those skilled in the art. The user may choose to view video images of all the other teleconference participants, or may alternatively choose to view only a subset of the participants (in order to conserve bandwidth, for example). Although different client computers may use cameras 30 with different levels of resolution and image format, the client software running on each of the computers typically adjusts the images so that all of windows 92, 94, 96 have the same size and format.

Figure 5:
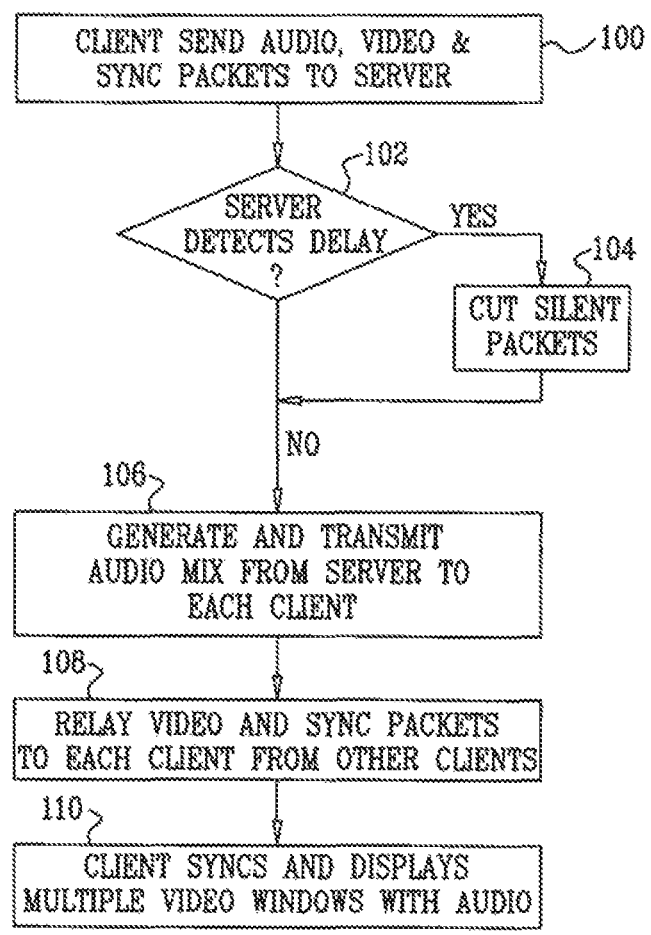
FIG. 5 is a flow chart that schematically illustrates a method for synchronizing and displaying data in a video teleconference, in accordance with an embodiment of the present invention.

FIG. 5 is a flow chart that schematically illustrates a method for synchronizing and displaying data in a video teleconference, in accordance with an embodiment of the present invention. Client computers participating in the video teleconference transmit uplink audio, video and synchronization packets to server 34, at an uplink transmission step 100. To reduce communication delays, as well as reducing the computational load on the server, the client computers transmit audio and video data in separate packets, and generally transmit relatively small packets at regular intervals. Each packet is marked with a timestamp, as explained in detail herein below, while the synchronization packets indicate how the audio and video data should be aligned according to their respective timestamps.

For example, depending on the audio codec used by a given client computer, the client computer may generate a block of compressed audio data every 20 ms. Each block may be sent in its own packet, or a group of blocks may be combines in a single packet. (For instance, six of these blocks may be combined into an audio uplink packet every 120 ms.) Server 34 may determine the size of the audio packets based on the arrival statistics of packets that it receives from the client computers, such as delay, timing jitter and packet loss, and/or other network conditions, and may instruct the clients to use the packet size that it determines in this manner.

When TCP is used as the transport layer protocol, the TCP buffer size at the client and server is typically set to zero, so that packets are transmitted immediately (without the delay that TCP may otherwise add in an attempt to optimize overall throughput). Furthermore, to avoid retransmission of lost packets, the client computer and server may be programmed to suppress the impact of the packet acknowledgement feature of TCP, possibly by acknowledging all TCP packet serial numbers regardless of whether or not the packets were actually received.

During a teleconference, any given user will typically be silent much of the time, while listening to the other users. The client computer senses these silent intervals and marks the corresponding audio blocks in the uplink audio packets as "silent." To ensure proper detection of silent intervals, the teleconferencing software on the client computer may control the automatic gain control of the audio driver on the client computer to prevent the driver from turning up the gain when the user is not speaking.

Server 34 tracks the timestamps of the uplink audio and video packets that it receives from the participating client computers, at a delay detection step 102. The server may thus determine that a delay has developed in the stream of audio data arriving from one (or more) of the clients. If so, the server drops blocks or packets of audio data that the client in question has marked as silent, at a silence removal step 104, in order to restore proper synchronization. Similarly, if the server detects a delay in the uplink video packets from one of the clients, it may drop video frames.

After temporally aligning the uplink audio data, server 34 creates an audio mix for transmission to each of the client computers in the video teleconference, at a mixing step 106. Each client receives a mix of the audio data generated by the other clients. Thus, the server generates a number of different audio mixes, equal to the number of clients who are actively participating in the video teleconference. The audio mix packets contain their own timestamps, determined by the server, and may be accompanied by audio sync packets generated by the server. In addition to transmitting the audio mix and audio sync packets to the client, the server also relays to each client the video data and video sync packets transmitted by the other clients, at a packet relay step 108. In other words, while the audio data are mixed at the server, the video images and sync messages transmitted by the various clients are kept separate.

Each client receives the audio mix, video and sync packets, at a packet reception step 110. The video data from each of the other clients are used to generate an image in the corresponding window 92, 94, 96, as shown in FIG. 4. The clients use the information in the sync packets, together with the timestamps in the audio mix and video packets, to synchronize the individual video images with the mixed audio. In other words, the client plays the audio mix and decides, based on the sync information and timestamps, which video frames to display in each of the windows at each point in time. The client may speed up or slow down the video display in one or more of windows 92, 94, 96 in order to keep the timestamps of the video and the audio mix data properly aligned. If the client detects a delay in the audio stream, it may cut out any remaining silent intervals, or it may resample and slightly accelerate the sound output to make up the delay. If the client detects excessive delays, however, the client may notify the server of the problem, and the server will take remedial action, as described herein below with reference to FIG. 6.

A detailed scenario illustrating the operation of the synchronization mechanisms described above is presented herein below in an Appendix.

Figure 6:
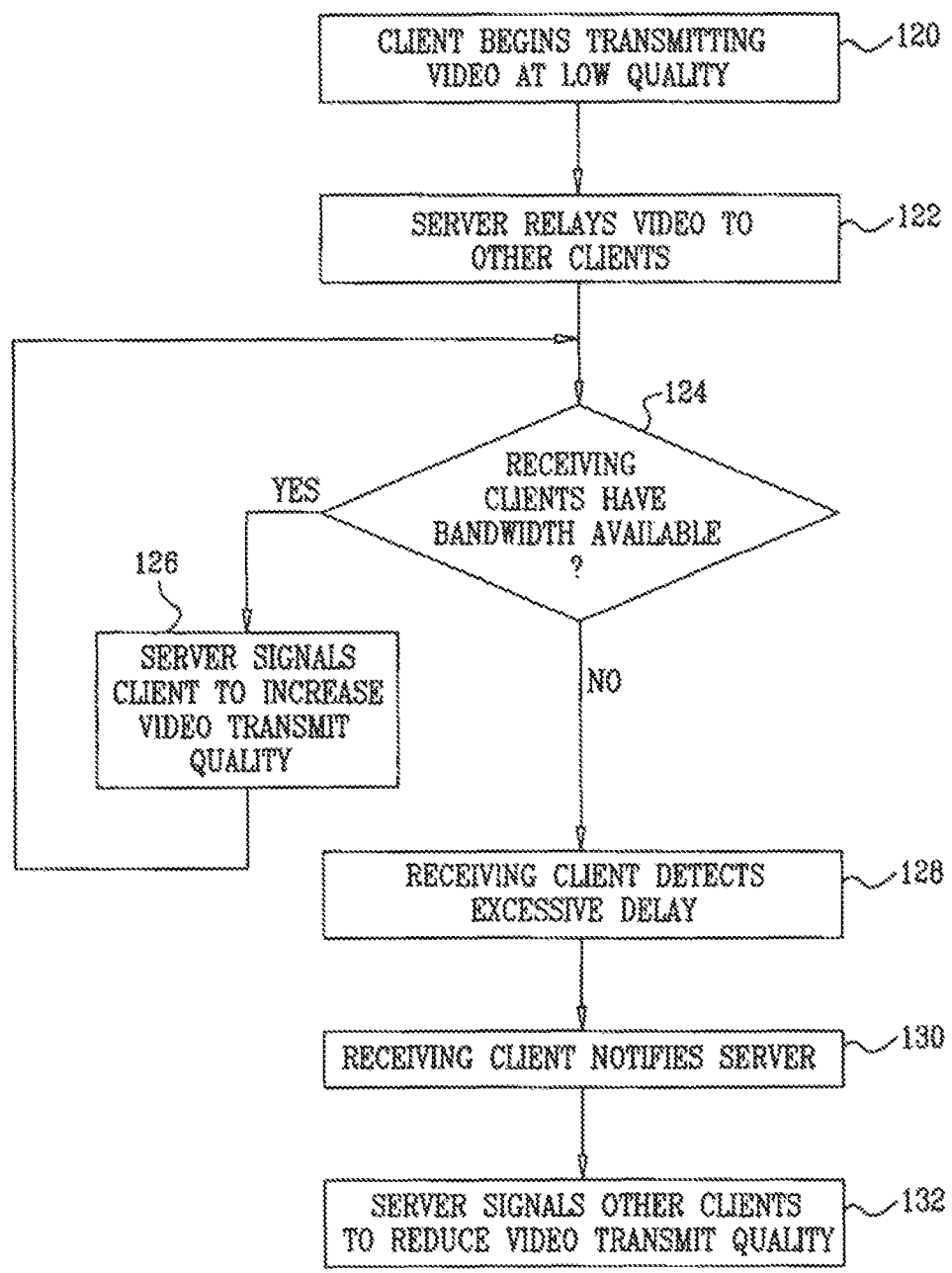
FIG. 6 is a flow chart that schematically illustrates a method for controlling bandwidth in a video teleconference, in accordance with an embodiment of the present invention.

FIG. 6 is a flow chart that schematically illustrates a method for controlling bandwidth in a video teleconference, in accordance with an embodiment of the present invention. This method is carried out in parallel with the method of FIG. 5 in the course of a teleconference in system 20. An object of this method is to make optimal use of the bandwidth available between the client computers and server 34. The bandwidth utilization is optimal in the sense that the client computers receive and display video images transmitted by the other client computers with the best possible image quality that can be supported reliably by the available bandwidth. "Quality" in this context may be expressed in terms of the image resolution, the frame update rate, or the degree of image compression (wherein greater compression, in lossy compression schemes, means poorer quality), all of which affect the bandwidth required for transmission of the video stream. Quality may be measured by bandwidth, delay, jitter, and packet loss.

The available bandwidth is determined, as explained further herein below, based on messages sent from the client computers to the server. This available bandwidth usually corresponds (with some exceptions) to the bandwidth of the "weakest link" in the video teleconference, i.e., the bandwidth of the client with the slowest connection to the server. Although other client computers in the video teleconference with faster connections to the server may be capable of transmitting uplink video packets with higher quality, the server would then have to expend considerable computing power in transcoding the high-quality video frames to a lower-quality format suitable for the "weakest link." In order to avoid placing this additional burden on the server, the client computers are instructed by the server to limit the quality of their video transmissions to the available bandwidth by adjusting adjusts one or several local quality parameters accordingly. Alternatively or additionally, the server may be capable of performing certain video transcoding functions, as well, in order to compensate for bandwidth discrepancies among the clients.

In one embodiment, at the start of the video teleconference, all clients begin transmitting video data packets at a low data rate, such as 48 kbps, at a transmission initiation step 120. Server 34 relays the video data packets (along with the audio mix packets, as described above) to the other clients, at a video relay step 122. The clients check the arrival statistics of the video data packets, at a bandwidth checking step 124. For example, the clients may check the average delay, jitter and/or fraction of packets lost. Low values of these statistical parameters indicate that the downlink transmissions to the client in question are well within the bounds of the available downlink bandwidth for this client, and additional bandwidth is still available for downlink transmission.

When the client computers determine at step 24 that they have additional bandwidth available, they send control messages to server 34 informing the server of the situation. The server checks the control messages from all the client computers to verify that all have additional bandwidth available, and if so, signals the client computers to increase the quality of the video images that they are transmitting, at a quality upgrade step 126. The clients then recheck the arrival statistics at step 124. If the packet arrival statistics are still favorable, the client computers notify the server, which then repeats step 126. The clients and server iterate through steps 124 and 126 as long as additional, unused bandwidth remains available.

As the bandwidth used for downlink transmission in the video teleconference approaches the limit of available downlink bandwidth, however, the statistical packet arrival parameters will begin to increase. Thus, a client may note, for example, an increase in average packet delay, and will notify the server accordingly. At this point, the server will stop instructing the clients to increase video quality and may even instruct the clients to back off a step in order to leave a margin for bandwidth fluctuations.

During the video teleconference, the client computers continue to monitor the packet arrival statistics, at a monitoring step 128. As a result, a client may note that one (or more) of the parameters has increased by more than a preset threshold above the initial, baseline value. For example, the client may determine that the packet delay has increased by 200 ms relative to the baseline. This sort of increase may indicate that a change in network conditions has reduced the downlink bandwidth available to the client. The client immediately sends a message to notify the server of the problem, at a server notification step 130.

To ensure rapid response, the client exchanges control messages with server 34 (using TCP) via a different socket from the one that is used for audio and video data, and the messages are handled by a dedicated software module in the server. The advantage of using the dedicated socket and module in this manner is that the communication channels of the conference server may be loaded with audio and video data, which may cause a delay in processing of the message sent at step 130. The dedicated module and socket, on the other hand, are not burdened with audio and video data and may therefore be able to respond immediately. Alternatively or additionally, when bandwidth problems occur, clients may notify not only conference server 34, but also management server 38 (assuming a separate management server is in use).

Generally, upon receiving the message sent by the client at step 130, server 34 or 38 immediately instructs the clients in the video teleconference to reduce their video transmission quality, at a quality reduction step 132. As a result, the quality of the video images displayed by all the clients will be reduced, but all of the participants in the video teleconference will still be able to see all of the other participants and maintain full participation. Alternatively, when one (or a few) of the client computers has significantly less bandwidth available than the remaining client computers in the video teleconference, the server may instruct this "weak" client to reduce the number of live video windows that it is displaying. The server may then pass video data downstream to the weak client only from those other clients whose images are displayed in the live windows, while cutting off the video streams from other clients. In this manner, the user of the weak client is still able to hear the audio and see images of some of the other participants, without detracting from the experience of the other participants. (In extreme cases, the weak client may be instructed to turn off the live video display entirely.)

In another embodiment, the server determines optimal bandwidth for each client computer in two steps. In a first step, the server determines, for each client computer, maximum and minimum uplink and downlink bandwidths. In a second step, the server constructs a linear programming model based on results obtained from the first step and solves it in one-step to generate the optimal video bandwidth values for each client computer in the video teleconference.

In the current embodiment, the first step includes calculating BW_up_Max_N, which refers to the maximum uplink bandwidth used by a conferencing client N. BW_up_Max_N is set by the upper bound of the video bitrate for compressing a specific video source configuration (i.e., video resolution and frame rate) set by the video conferencing system. This upper bound value is empirically determined for each video codec adopted by a video conferencing system. At this value the conferencing system of the current embodiment shall produce satisfactory video quality, further increases of the video bitrate above this value would not yield significant improvement in video quality.

BW_up_Min_N refers to the minimum uplink bandwidth used by a client computer N. This value is similarly set by the lower bound of the video bitrate configured by a video conferencing system for a specific video source configuration.

The Table 1 lists some typical lower and upper bounds of video bitrate values for various common video resolutions used in video conferencing application. H.264 or VP8 video codec is assumed in this embodiment.

TABLE 1

Sample Video Bandwidths as Defined by Video Source Configuration

| Resolution | BW_up_Min (Kbit/s) | BW_up_Max (Mbit/s) |
|---|---|---|
| CIF | 96 | 0.384 |
| VGA | 384 | 1 |
| 720P | 768 | 2 |

Different bitrate values can be adopted for different client computers within the same application. For example, a lower max bitrate value may be defined for mobile client computers versus desktop client computers. In practice, the total bandwidth used by a client computer includes audio and network protocol bandwidths in addition to video bandwidth. Because video bandwidth typically takes up the majority of total bandwidth, this disclosure ignores the difference between total bandwidth and video bandwidth in the subsequent discussions. However, this simplification does not affect the validity and applicability of the method described here.

BW_dn_Max_N refers to the maximum downlink bandwidth available for client computer N and may be calculated or measured. A person having ordinary skill in the art would be able to devise many methods to measure the capacity of a network transmission channel. For example, a Forward Error Correction (FEC) method may be used to generate excessive traffic to flood the communication channel in order to measure the actual throughput of the channel. Specifically, the server applies a FEC algorithm on video packets transmitted to client computer N. The method starts with injecting 50% redundant packets into the downlink and measuring the throughput values at the client computer. The method continues by injecting double the amount of redundant packets into the downlink until the throughput values as measured by the client computer remain the same in two subsequent measurements. The method the stops, and the last value is the final maximum bandwidth value. This method allows the conferencing system of the current embodiment to measure the channel capacity with actual traffic, which increases the accuracy of the channel capacity measurement. It also allows the system to continue to transmit ongoing video packets while measuring the channel capacity, so the video teleconference is not interrupted. Finally, since the excessive throughput is actually redundant packets for the corresponding video packets, when the test approaches the maximum bandwidth capacity and packet loss occurs, the system is able to sustain video transmission quality by leveraging the properties of FEC.

BW_dn_Min_N refers to the minimum downlink bandwidth available for client computer N and may be calculated or measured. The default value may be 0. It also be set to a reasonable higher value to reduce the amount of computation needed to calculate the optimal uplink bandwidth. For example, it can be set to:

$$BW\_dn\_Min\_N = \Sigma BW\_up\_Min\_i, \text{ where } i=1, \text{SizeofGroup and } N=i!.$$

In this example, the minimum downlink bandwidth for client N should be at least as high as the sum of minimum uplink bandwidth by all other clients in the video teleconference.

To calculate the optimal uplink bandwidth for each client computer, the following conditions are present in this embodiment:

For each client computer N, its current uplink bandwidth is always between minimum and maximum values:

$$BW\_up\_Min\_n <= BW\_up\_Cur\_n <= BW\_up\_Max\_n,$$

where $1 <= n <= \text{SizeOfGroup}$ \hfill (Condition 1).

For each client computer N, its current downlink bandwidth is always between minimum and maximum values:

$$BW\_dn\_Min\_n <= BW\_dn\_Cur\_n <= BW\_dn\_Max\_n,$$

where $1 <= n <= \text{SizeOfGroup}$ \hfill (Condition 2).

In the conferencing system of the current embodiment, a server receives a video stream from a client computer n and sends a copy of the video stream to each of the other client computers i (where i.noteq.n) in the video teleconference. Therefore, at each client computer n, the current total receiving (downlink) video bandwidth should equal to the sum of current uplink video bandwidth from all other clients computers i (where i.noteq.n) in the video teleconference, assuming no packet loss. This can be captured in the following condition:

$$\Sigma BW\_up\_Cur\_i <= BW\_dn\_Max\_n, \text{ where } i=1, \text{SizeofGroup and } n=i! \hfill \text{(Condition 3)}.$$

To achieve maximum quality for a video teleconference, the conferencing system in the current embodiment sets the goal to maximize channel utilization (e.g., higher video bandwidth yields higher video quality) but not too high so as to incur packet loss (e.g., when traffic exceeds channel capacity), which would significantly degrade video quality. This can be described in the following mathematical expression:

$$\Sigma(BW\_up\_Cur\_i/BW\_up\_Max\_i) \rightarrow \text{MAX, where } i=1, \text{SizeofGroup}.$$

The above expression can be solved based on Conditions 1 through 3 and using a linear programming model, such as a standard "Simplex" linear programming method. The resulting BW_up_Cur_i value is then the optimal video bandwidth setting for each client individually.

In comparison to commonly practiced video communication quality of service systems where small step adjustments are incrementally applied to empirically determine the optimal working configuration for the system, the conferencing system of the current embodiment can achieve optimal configuration in much faster convergence time, yielding more stable system behavior and higher communication quality.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix—Audio/Video Synchronization

The scenario presented in this Appendix assumes that client computers belonging to three users, Alice, Bob and Charlie, are to participate in a video teleconference via server 34. Each client computer keeps track of two different times:

Clock Time (CT)—the internal computer time, using ticks to represent the number of milliseconds since the computer was last restarted.

Stream Time (ST)—the time elapsed since the computer started to send audio and video to the server. Like the clock time, it is measured in milliseconds.

In the video teleconference, every client computer periodically sends two different types of sync messages, one for audio and one for video, indicating the relation between clock time and stream time. The clock time is the same for audio and video, but the stream time is typically different, because the computer does not always start to send the video data at the exact same time as starting to send the audio data. Sync messages are sent at preset intervals (typically in the range 1-5 sec). Each data message transmitted by a client computer holds the video (or audio) data itself in binary format, along with a timestamp indicating the corresponding stream time.

FIG. 7 is a table showing the timing of audio and video data transmitted by the participants in this sample video teleconference, in accordance with an embodiment of the present invention. For each user, the table shows the sequence of audio data blocks and video frames generated by the corresponding computer, labeled with the corresponding clock times and stream times. As noted above, the stream times of the audio and video data for each user start at different points in clock time. (For example, for Alice, the audio stream starts at CT=1000, while the video stream starts at CT=1100.) These discrepancies are resolved by the use of sync messages.

FIG. 8 is a table showing the messages sent to server 34 by Alice's computer, in accordance with an embodiment of the present invention. When Alice starts to send her video, her computer sends an audio sync message with her computer clock time (1000) and '0' (zero) in the stream time, followed by an audio data packet containing audio data and '0' stream time. Immediately thereafter, the computer begins transmitting the video stream with a video sync message (clock time 1100, stream time 0), followed by a video data packet with '0' stream time. Subsequent audio and video data packets contain a timestamp indicating the current stream time, which is incremented by the appropriate audio interval or video interval.

After the preset synchronization interval has elapsed (in this case, 1 sec) in a given data stream, the computer transmits a further sync packet, giving the current clock time and stream time. Thus, as shown in FIG. 8, the computer transmits a video sync packet at CT=2100, ST=1000. (Because of the shorter audio interval, the time covered by FIG. 8 does not include the next audio sync packet.) The periodic sync packets permit the server and client computers to detect and correct inaccuracies of synchronization.

FIG. 9 is a table showing the messages sent from server 34 to Alice's computer, in accordance with an embodiment of the present invention. As noted earlier, the video data and video sync packets from Bob's and Charlie's computers are passed through by the server to Alice's computer without change. The server generates downlink audio data packets containing a mix of the audio data received from Bob's and Charlie's computers. The stream time of the audio mix, which is inserted by the server as a timestamp in the downlink audio data packets, is determined by the server and generally does not correspond to the stream times of the client computers. Therefore, the server also generates and transmits to Alice's computer audio sync packets, which indicate the correspondence between the stream time of the audio mix and the individual clock times of Bob's and Charlie's computers.

Alice's computer plays the received audio mix and synchronizes the video data with the audio using the time information (clock time and stream time) contained in the sync messages. For each downlink audio data packet, the client computer performs the following steps:

Receive the audio mix data message.

Get the audio mix stream time from this message.

Add this audio mix stream time to the clock time from the synchronization message of every participant and get the clock time for this audio mix (different clock time for each participant).

Find the same clock time in the video stream of each participant, using the video synchronization and data messages.

Display the video frame corresponding to this clock time.

FIG. 10 is a table showing the timing of the audio mix and video data frames received by Alice's computer, in accordance with an embodiment of the present invention. The table illustrates how Alice's computer synchronizes the video data sent by Bob's and Charlie's computers with the audio mix. For example, at stream time 900 in the audio mix (in the leftmost column of the table), Alice's computer determines that Bob's clock time is 1500, while Charlie's clock time is 1600. Alice's computer uses these clock times as an index to find the closest corresponding frames in Bob's and Charlie's video streams. Thus, for audio stream time 900, Alice's computer will display the frame from Bob's video stream that has clock time 1460 and video stream time 360, while displaying the frame from Charlie's video stream that has clock time 1560 and stream time 360 (coincidentally the same as Bob's).

What is claimed is:

1. A method comprising:
   establishing, by at least one processor of a first computing device, a first communication link over a network between the first computing device and a communications server;
   receiving, by the at least one processor and from the communications server, data associated with a video conference application associated with initiating a video conference between the first computing device and a second computing device;
   establishing, by the at least one processor and using the video conference application, a second communication link, over the network or a second network, between the first computing device and the second computing device;
   transmitting, by the at least one processor, audio and video packets via the second communication link, wherein the audio and video packets respectively comprise audio and video data; and
   transmitting, by the at least one processor, synchronization packets via the second communication link, wherein the audio and video data are synchronized for output at the second computing device based on synchronization information comprised in the synchronization packets.

2. The method of claim 1, further comprising:
   establishing, by the at least one processor, a third communication link, over the network or the second network, between the first computing device and a third computing device, wherein each of the first, second, and third computing devices are enabled to participate in the video conference.

3. The method of claim 1, wherein the audio and video packets comprise or are comprised in the synchronization packets.

4. The method of claim 1, wherein the audio and video packets are transmitted substantially simultaneously with the synchronization packets.

5. The method of claim 1, further comprising:
   transmitting, by the at least one processor, a first codec for the second computing device, wherein the first codec is used by the second computing device to decode at least one of the audio and video data.

6. The method of claim 1, wherein the first computing device comprises a first mobile phone, and wherein the second computing device comprises a second mobile phone.

7. The method of claim 1, further comprising:
   receiving, by the at least one processor via the second communication link, second audio packets, second video packets, and second synchronization packets, wherein the second audio and the second video packets respectively comprise second audio and second video data, and wherein the second audio and the second video data are synchronized for output at the first computing device based on second synchronization information comprised in the second synchronization packets.

8. A non-transitory computer-readable medium comprising code that, when executed, causes at least one processor of a first computing device to perform the operations of:
   establishing, by the at least one processor, a first communication link over a network between a first computing device and a communications device;
   receiving, by the at least one processor, data associated with a video conference operation initiated or to be initiated between the first computing device and a second computing device;
   establishing, by the at least one processor, a second communication link, over the network or a second network, between the first computing device and the second computing device;
   transmitting, by the at least one processor, audio and video data; and
   transmitting, by the at least one processor and to the second computing device via the second communication link, synchronization data, wherein output of the audio and video data at the second computing device is synchronized based on the synchronization data.

9. The non-transitory computer-readable medium of claim 8, further comprising code that, when executed, causes the at least one processor to perform the operations of:
   establishing, by the at least one processor, a third communication link, over the network or the second network, between the first computing device and a third computing device, wherein each of the first, second, and third computing devices is enabled to participate in a three-way video conference.

10. The non-transitory computer-readable medium of claim 9, wherein the three-way video conference is initiated by at least one of the first computing device or the second computing device.

11. The non-transitory computer-readable medium of claim 8, wherein the audio data is comprised in a first packet, wherein the video data is comprised in the first packet or a second packet, and wherein the synchronization data is comprised in the first packet, or the second packet, or a third packet.

12. The non-transitory computer-readable medium of claim 8, further comprising code that, when executed, causes the at least one processor to perform the operations of:
   selecting, by the at least one processor, a first codec for the second computing device; and
   transmitting, by the at least one processor, the first codec to the second computing device, wherein the first codec is used by the second computing device to decode at least one of the audio data or the video data.

13. The non-transitory computer-readable medium of claim 8, wherein the video conference operation is part of a mobile application.

14. The non-transitory computer-readable medium of claim 8, wherein the audio and video data are transmitted either substantially simultaneously with or separately from the synchronization data.

15. A first computing device comprising:
   at least one memory comprising instructions; and
   at least one processor configured to execute the instructions, wherein executing the instructions causes the at least one processor to perform the operations of:
   establishing, by the at least one processor, a first communication link over a network between a first computing device and a communications system;
   receiving, by the at least one processor and from the communications system, data associated with a video conference application associated with initiating a video conference between the first computing device and a second computing device;

establishing, by the at least one processor, a second communication link, over the network or a second network, between the first computing device and the second computing device;

transmitting, by the at least one processor and to the second computing device via the second communication link, audio and video data; and transmitting, by the at least one processor and to the second computing device via the second communication link, synchronization packets, wherein the audio and video data are output at the second computing device based on synchronization information comprised in the synchronization packets.

16. The first computing device of claim 15, wherein executing the instructions further causes the at least one processor to perform the operations of:

establishing, by the at least one processor, a third communication link over the network between the first computing device and a third computing device, wherein each of the first, second, and third computing devices is enabled to participate in the video conference.

17. The first computing device of claim 16, wherein the third communication link is established using the video conference application.

18. The first computing device of claim 16, wherein executing the instructions further causes the at least one processor to perform the operations of:

transmitting, by the at least one processor, the audio and video data via the third communication link; and transmitting, by the at least one processor, the synchronization packets via the third communication link, wherein the audio and video data are synchronized for output at the third computing device based on the synchronization information.

19. The first computing device of claim 15, wherein executing the instructions further causes the at least one processor to perform the operations of:

selecting, by the at least one processor, a first codec for the second computing device; and transmitting, by the at least one processor, the first codec to the second computing device.

20. The first computing device of claim 15, wherein the communications system comprises, is, or is comprised in the second computing device, or wherein executing the instructions further causes the at least one processor to perform the operations of:

receiving, by the at least one processor via the second communication link, second audio and second video data, and second synchronization packets, and wherein the second audio and the second video data are output at the first computing device based on synchronization information comprised in the second synchronization packets.

* * * * *